June 23, 1959     K. W. HAGANS     2,891,561

EGG WASHING DEVICE

Filed Aug. 22, 1956

*INVENTOR.*
KENNETH W. HAGANS
BY
Maurice A. Weikart
ATTORNEY

United States Patent Office 2,891,561
Patented June 23, 1959

2,891,561

EGG WASHING DEVICE

Kenneth W. Hagans, Milford, Ind.

Application August 22, 1956, Serial No. 605,550

4 Claims. (Cl. 134—102)

This invention relates generally to devices for washing fragile objects and in particular to egg washing machines.

It has been customary in the past to provide egg washing machines with a container for the washing fluid, holding submerged, or partly submerged, a basket or other perforated receptacle which contains the eggs to be washed. An impeller within the container is then used to agitate the washing fluid through the eggs, or jets of washing fluid are directed tangentially along one margin of the basket which is thereby caused to rotate within the washing fluid, the resulting turbulence having a scrubbing action on the eggs. These arrangements have not proven to be entirely satisfactory in that the harsh water movement resulting from the impeller action or from the rotating egg container often causes objectionable breakage in the eggs being washed.

One object of the present invention is to provide a device for washing fragile objects, such as eggs, which uses no impellers or high velocity water jets, but obtains the necessary washing action by causing the eggs to be gently agitated within the washing fluid by means of upwardly directed streams of aerated fluid, the softness of the action of the water streams being a function of the amount of aeration of the washing fluid.

A further object is to provide an egg washing device as above described in which adjusting means permit adjustment of the amount of aeration of the washing fluid to accommodate the device to eggs of varying shell strength and frangibility.

A further object is to provide an egg washing machine in which the washing fluid is continually drained from and recirculated into the washing fluid container, with aeration of the fluid taking place during the fluid recirculation.

A further object is to provide an egg washing machine as immediately described above having electrical heating means, including a temperature responsive controller for maintaining the washing fluid at the proper temperature.

A further object is to provide an egg washing device as described above having timing means for adjustably determining the egg washing cycle duration.

These and other objects will be apparent from the following detailed description of the preferred embodiment of the invention which corresponds to the drawings and accompanying specification, in which.

Figure 1:
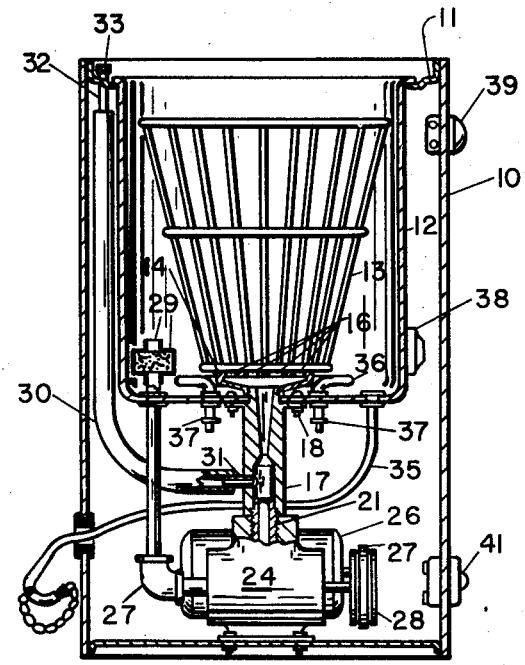
Fig. 1 represents a side, sectional view of the device.

Referring initially to Fig. 1, there is shown at 10 a cylindrical outer housing having a marginal, inwardly extending flange member 11 secured thereto by any suitable means such as welding. Flange member 11 supports a washing fluid container 12, adapted to receive an egg container or basket 13, which is removable from the container 12, but during the washing operation rests upon the platform provided by the distribution chamber member 14. Member 14 is generally bell-shaped and its flat upper portion forms a support base for the basket 13. A plurality of openings 16 are adapted to direct streams of aerated washing solution upwardly through basket 13, as will subsequently be described. The internally threaded lower portion of member 14 fastens to the upper end of a venturi member 17 which extends through a central opening in the bottom of container 12 and is secured in sealed relation thereto by means of screws 18.

Figure 3:
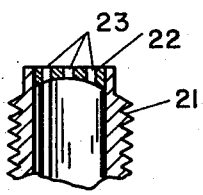
Fig. 3 shows an enlarged, sectional view of a portion of the aerating assembly.

Threaded into the lower end of member 17 is a nozzle member 21, shown in detail in Fig. 3. An orifice plate 22 is carried by the discharge end of member 21, and provides multiple orifices 23 which are sufficiently large to preclude their being clogged by foreign material in the washing solution but are effected to break the inflow of washing solution into multiple streams providing an increased air-water interface to the air entering the member 17, thereby increasing the effective air aspiration into the washing fluid.

The lower portion of nozzle member 21 is threaded into the discharge fitting of a conventional pump 24, which may be of gear type or centrifugal type construction. The pump 24 receives its motive power from an electrical motor 26 through a conventional belt 27 and pulley 28 transmission. The inlet for the pump 24 is provided by the piping 27 which extends through the base of the container 12 and carries a filter 29 at its upper end. It will be understood that with the container 12 filled with washing fluid and with pump 24 in operation, the fluid will be recirculated through filter 29, piping 27, pump 24, members 21 and 17, through distribution chamber 14, and upwardly through the basket 13.

Connected into the basal portion of the venturi member 17 is an air injection fitting 31, which, in turn is connected to air intake member 32, by means of hose 30. Member 32 carries a knurled adjustment knob 33 which may be used to vary the quantity of air taken in by the multiple fluid streams passing through the mouth of venturi member 17. A drain hose 35 extends from container 12 through the housing 10 and carries a removable plug which permits drainage of the container 12 through hose 35.

Mounted upon the base of container 12 are electric heating means 36, which may be of the conventional sheathed strip type, having terminals 37 extending through the base portion of container 12. The function of heating means 36 is to retain the washing fluid at proper temperature under control of a conventional surface type thermostat 38, which may take the form of that disclosed in Malone Patent 2,691,712. A timer 39 of conventional spring wound type, adapted, after setting of the timing interval, to open its contacts to deenergize motor 26, is mounted near the upper margin of housing 10. Near the base of the housing 10 is a pilot light 41, which, as will be evident from Fig. 4, is lighted whenever heater 36 is in energized condition and is out when heater 36 has been deenergized by opening of thermostat 38.

Figure 4:
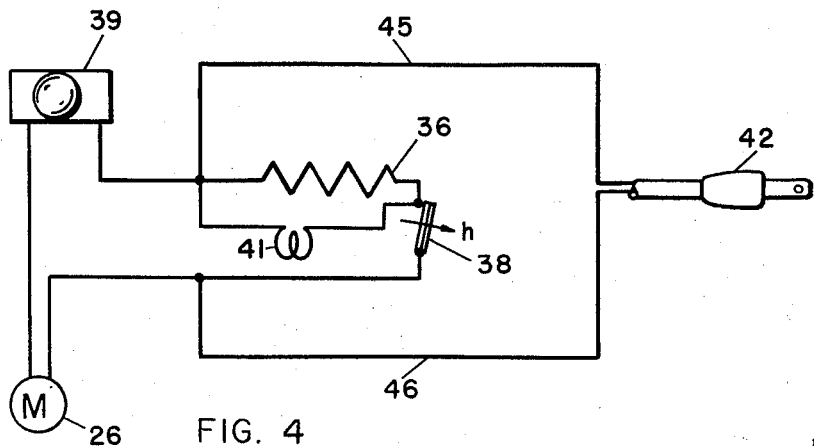
Fig. 4 is a schematic wiring diagram of the electrical circuit of the device.

Fig. 4 illustrates the electrical circuit interconnecting the above described components, in which 42 designates a plug for connection to an electrical power supply. Timer switch 39 and motor 26 are connected in series across bus wires 45 and 46, as are the electric heating means 36, thermostat 38 and pilot lamp 41.

Figure 2:
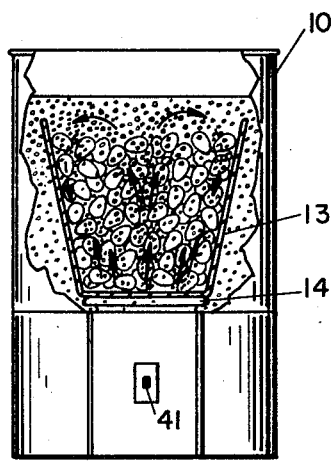
Fig. 2 represents a side view of the device with a portion broken away to show the floating movement of the eggs in the aerated water streams.

From the foregoing description it will be apparent that as the washing fluid is recirculated to the container 12, air is entrained therein and the resulting soft streams of fluid issuing from chamber 14 gently lift the eggs within basket 13 and cause a circulatory movement of the eggs generally upward in the central portion of basket 13 and generally downwardly along the sides of the basket 13, it being understood that, as shown in Fig. 2, the level of washing solution is such that none of the eggs being washed are lifted outside the basket 13. Adjustability of the air intake 32 permits variation in the air content, and, consequently, the softness of the streams of aerated washing fluid issuing from distribution chamber 14, also the amount of agitation, to accommodate the successful washing of batches of eggs of various shell strength and the number of eggs in the basket in a washing cycle.

Variations in the present invention may occur to those skilled in the art which are yet within the scope of the present invention, which is to be limited only by the appended claims.

What is claimed is:

1. A device for washing eggs comprising a washing compartment adapted to contain the liquid washing solution and the eggs to be washed submerged therein, a perforate container for the eggs, a draw-off passage and an inlet passage for said compartment, recirculating means interconnecting said passages, said inlet passage being formed by a tubular fitting having a venturi orifice therein, the outlet end of said fitting extending into said washing compartment and being formed to support said container and provide a distribution chamber for the direction of fluid into said container, an opening to atmosphere in said fitting adjacent said venturi orifice to supply air for the aeration of fluid passing through the inlet passage, and a multi-orificed member disposed in said inlet passage upstream of said air opening to provide multiple streams of liquid past said air opening thereby increasing the air-fluid interface and consequently the degree of aeration of said fluid.

2. A device for washing eggs comprising a washing compartment adapted to contain the liquid washing solution and the eggs to be washed submerged therein, a draw-off passage and an inlet passage for said compartment, recirculating means interconnecting said passages, said inlet passage being formed by a tubular fitting having a venturi orifice therein, the outlet end of said fitting extending into said washing compartment and being formed to direct fluid through the eggs contained therein, an opening to atmosphere in said fitting adjacent said venturi orifice to supply air for the aeration of liquid passing through the inlet passage, a multi-orificed member disposed in said inlet passage to provide multiple streams of liquid past said air opening thereby increasing the air-fluid interface and consequently the degree of aeration of said fluid, and means for adjusting the size of said air opening to selectively vary the rate at which air is admitted therethrough.

3. A device for washing eggs comprising a washing compartment adapted to contain the liquid washing solution and the eggs to be washed submerged therein, a perforate container for the eggs, a draw-off passage and an inlet passage for said compartment, recirculating means interconnecting said passages, said inlet passage being formed by a tubular fitting having air-injection means therein, the outlet end of said fitting extending into said washing compartment and being formed to support said container and provide a distribution chamber, the container supporting surface of said outlet end having multiple ports therein communicating with said distribution chamber for directing streams of aerated fluid into said container thereby gently agitating the eggs accommodated within the container, and means to control the admission of air to said air injection means.

4. A device for washing eggs comprising a washing compartment to contain the liquid washing solution and the eggs to be washed submerged therein, a perforate container for the eggs, a draw-off passage and an inlet passage for said compartment, recirculating means interconnecting said passages, said inlet passage being formed by a tubular fitting having a venturi orifice therein, the outlet end of said fitting extending into said washing compartment and being formed to support said container and provide a distribution chamber for the direction of fluid into said container, an opening to atmosphere in said fitting adjacent to said venturi orifice, and an orificed member disposed in said inlet passage to provide a stream of liquid to induce the flow of air into said passage to aerate said liquid.

References Cited in the file of this patent

UNITED STATES PATENTS

| | | |
|---|---|---|
| 2,052,622 | Hale | Sept. 1, 1936 |
| 2,520,889 | Paden | Aug. 29, 1950 |
| 2,548,100 | Culligan et al. | Apr. 10, 1951 |
| 2,575,704 | Clark | Nov. 20, 1951 |
| 2,576,236 | Paden | Nov. 27, 1951 |
| 2,666,439 | Bechtol | Jan. 19, 1954 |
| 2,719,704 | Anderson et al. | Oct. 4, 1955 |
| 2,725,062 | Vile | Nov. 29, 1955 |
| 2,793,016 | Aghnides | May 21, 1957 |